United States Patent Office 3,363,007
Patented Jan. 9, 1968

3,363,007
PROCESS FOR BROMINATING BISPHENOLS
Theodore E. Majewski, Midland, and Larry R. Collins, Freeland, Mich., assignors to The Dow Chemical Company, Midland, Mich., a corporation of Delaware
No Drawing. Filed May 10, 1965, Ser. No. 454,734
5 Claims. (Cl. 260—619)

ABSTRACT OF THE DISCLOSURE

Lower alkylidenebisphenols are tetrabrominated to obtain high yields of pure products using as a reaction medium aqueous lower alkyl monoether of ethylene or propylene glycol containing 20–75 percent by weight of water.

---

This invention relates to a new and useful process for brominating alkylidene-bisphenols. It is particularly concerned with a novel process for the production of essentially colorless tetrabrominated bisphenols in high yields and of exceptional purity.

Known processes for halogenating alkylidene-bisphenols have employed reaction solvents such as acetic acid, polychlorinated hydrocarbons, and lower alkanols. Halogenations carried out in these solvents provide fairly good yields of the desired polyhalogenated bisphenols, but the products, particularly brominated bisphenols, are usually obtained as compounds of only fair purity and often having an undesirable brown or red color. The reaction of the last of the bromine in making tetrabromobisphenols is slow and long reaction times are usually required to obtain fully brominated products.

It has now been found that when the bromination of an alkylidenebisphenol is conducted in the presence of a reaction medium consisting essentially of the lower alkyl monoether of an alkylene glycol and water in certain proportions, there is produced a high yield of a substantially pure brominated bisphenol having a high melting or freezing point and nearly free of the typical tan or pink color which is often associated with these compounds. The product can frequently be used directly without further purification in applications where high purity and freedom from color are essential.

The glycol ether component of the reaction medium is the lower alkyl monoether of a vicinal alkylene glycol of 2–3 carbon atoms, i.e., ethylene or propylene glycol, where lower alkyl is of 1–4 carbon atoms. Preferably, the lower boiling ether alcohols are employed, these being the methyl and ethyl ethers of the above glycols. The glycol monoether component represents 25–80% by weight of the reaction medium, the remainder being water. When a bromination is carried out in an aqueous medium containing less than about 25% of the glycol ether, for example in water alone, the product is highly colored and is likely to be of low assay. When the reaction medium contains more than about 80% of glycol ether, yields are low because of higher product solubility.

The bromination is run at a temperature of 0–115° C., preferably at about 25–80° C. Best results are obtained by finishing the bromination at a temperature of 50–80° C. For highest product purity, it is usually advantageous to continue stirring the reaction mixture for 0.5–2 hours at this higher temperature after addition of all of the bromine. Since the tetrabrominated bisphenol is essentially insoluble in the reaction medium at ambient temperature, a convenient method for isolating the product in high yield comprises filtering the reaction mixture at about room temperature.

Liquid bromine is the preferred bromine reagent although an equivalent quantity of the so-called bromine chloride, BrCl, may be used if desired. The term bromine reagent is used here and in the appended claims to define the free halogen reactant and it includes both bromine and bromine chloride. From 4 to about 4.5 molar equivalents of bromine reagent are used per mole of bisphenol.

The process is adapted to tetrabromination of alkylidenebisphenols having the formula

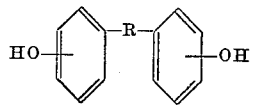

wherein R is an alkylidene radical of 1–4 carbon atoms, i.e., a hydrocarbon radical wherein both phenolic rings are attached to the same carbon atom. Bisphenols such as methylenediphenol, ethylidenediphenol, isopropylidenediphenol, and butylidenediphenol are thereby included. The process is particularly adapted to making 4,4′-isopropylidenebis(2,6 - dibromophenol), often referred to as tetrabromobisphenol A.

The following examples are illustrative of the present invention, but they are not to be construed as limiting.

Example 1

A solution of 172 g. of p,p′-isopropylidenediphenol in 400 g. of 50% aqueous 2-ethoxyethanol was prepared in a reaction flask. While the temperature was held below 50° C. by occasional cooling, 494 g. of liquid bromine was added dropwise in twenty (20) minutes to the stirred solution. The reaction mixture was then heated to 65° C. and it was stirred at this temperature for two hours. The resulting slurry was cooled to 25° C. and filtered. The filter cake of 4,4′-isopropylidene-bis(2,6 - dibromophenol) was washed first with four 50 ml. portions of 2-ethoxyethanol, then with four 100 ml. portions of water. The dried cake was an off-white solid weighing 392.2 g. and having a freezing point of 180.3° C. APHA color of 10 g. in 30 ml. of methanol was 130.

Essentially identical results were obtained when the above procedure was repeated except for adding the bromine at 65–80° C.

Example 2

Bromine (494 g.) was added to a stirred solution of 172 g. of p,p′-isopropylidenediphenol in 400 g. of 30% aqueous 2-ethoxyethanol at 70–80° C. in 24 minutes. The reaction product was then stirred for two hours twenty minutes at 80–90° C. The 4,4′-isopropylidenebis(2,6-dibromophenol) product was filtered at 25° C., washed with water and dried to obtain 392.2 g. of off-white solid, freezing point 180.3° C., APHA color 130.

Example 3

Use of a glycol ether-water reaction medium containing too little glycol ether is shown to give a product of inferior quality.

A solution of 86 g. of p,p′-isopropylidenediphenol in 200 g. of 20% aqueous 2-ethoxyethanol was warmed to 38° C. and 247 g. of bromine was added dropwise to the stirred solution over a period of about 1.5 hours. About half of the bromine was added at 45–55° C., the remainder was added at 70–73° C. The reaction mixture was then cooled to room temperature, filtered, and the filter cake was washed with fresh reaction solvent and with water. The dried 4,4′-isopropylidenebis(2,6-dibromophenol) was a tan solid, weight 192 g., freezing point 163° C.

Example 4

Using the same quantities of materials as in Example 2, bromine was added at 60–85° C. in 32 minutes to the stirred solution of bisphenol in 60% aqueous 2-ethoxyethanol. The reaction mixture was then cooled immediately to 25° C., filtered, and the filter cake washed with six 50 ml. portions of 50% aqueous 2-ethoxyethanol and four 100 ml. portions of water. The dried 4,4'-isopropylidenebis(2,6 - dibromophenol) weighed 349 g. and had a freezing point of 176.0° C., APHA color 110.

Example 5

To a stirred solution of 172 g. of p,p'-isopropylidenediphenol in 432 g. of 65% aqueous 2-ethoxyethanol there was added 484 g. of bromine in 20 minutes at 27–60° C. The resulting reaction mixture was heated for one hour at reflux temperature after the bromine addition. The cooled slurry was filtered at 25° C. and the filter cake was washed twice with 65% aqueous 2-ethoxyethanol and dried. The 4,4'-isopropylidene-bis(2,6 - dibromophenol) product was a white powder weighing 344.1 g., freezing point 179.2° C., APHA color 13.

Example 6

A solution of 172 g. of p,p'-isopropylidenediphenol in 375 g. of 75% aqueous 2-ethoxyethanol was stirred while 484 g. of bromine was added dropwise at 45–50° C. in 10 minutes. The reaction mixture was stirred for one hour at 75–90° C., then cooled to room temperature and filtered. The filter cake was washed successively with several portions each of fresh reaction solvent and water, then dried to obtain 305.2 g. of off-white 4,4'-isopropylidenebis(2,6-dibromophenol), freezing point 179.6° C.

Example 7

Bromine (484 g.) was added at 25–35° C. to a solution of 172 g. of p,p'-isoproylidenediphenol in 200 ml. of 100% 2-ethoxyethanol over a period of 30 minutes. A dark purple reaction mixture was produced. When this was heated to 40° C., there was a vigorous evolution of gaseous HBr. As the temperature rose, 100 ml. of water was added, causing further increase in temperature and cooling was necessary to prevent boiling. The reaction mixture was allowed to cool overnight, then the 4,4'-isopropylidenebis(2,6-dibromophenol) product was isolated as before to obtain 234.6 g. of off-white solid, a yield of 57.4% based on the starting bisphenol. This material has a melting point of 180–181° C. and a APHA color of 57.

Example 8

A solution of 114 g. of p,p'-isopropylidenediphenol in 268 g. of 50% aqueous 2-methoxyethanol was stirred at 28–38° C. and 330 g. of liquid bromine was added over a period of 30 minutes. The reaction mixture was stirred for 2 hours at 50° C. and the precipitated 4,4'-isopropylidenebis(2,6-dibromophenol) was filtered off, washed with fresh solvent, and dried. The product was an off-white powder, weight 262.9 g., freezing point 177.6° C., APHA color 90.

Example 9

Example 8 was repeated using as the reaction solvent the same quantity of the monomethyl ether of propylene glycol. The 4,4'-isopropylidenebis(2,6-dibromophenol) product weighed 260.9 g. and had a freezing point of 178.1° C., APHA color 90.

We claim:
1. A process for brominating an alkylidenebisphenol of the formula

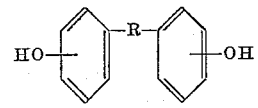

wherein R is an alkylidene radical of 1–4 carbon atoms which comprises reacting said bisphenol with about 4–4.5 molar equivalents of bromine reagent at about 0–115° C. in the presence of a reaction solvent consisting essentially of 20–75% by weight of water and 80–25% of a lower alkyl monoether of a vicinal alkylene glycol of 2–3 carbon atoms wherein lower alkyl is of 1–4 carbon atoms.

2. A process for making 4,4'-isopropylidenebis(2,6-dibromophenol) which comprises reacting p,p'-isopropylideneiphenol with 4–4.5 molar equivalents of bromine reagent at 0–115° C. in the presence of a reaction solvent consisting essentially of 20–75% by weight of water and 80–25% of a lower alkyl monoether of a vicinal alkylene glycol of 2–3 carbon atoms wherein lower alkyl is of 1.4 carbon atoms and separating 4,4'-isopropylidenebis(2,6-dibromophenol) from the resulting reaction mixture.

3. The process of claim 2 wherein the glycol monoether is 2-ethoxyethanol.

4. The process of claim 2 wherein the glycol monoether is 2-methoxyethanol.

5. The process of claim 2 wherein the glycol monoether is a monomethyl ether of propylene glycol.

References Cited

FOREIGN PATENTS

1,313,469 11/1962 France.

LEON ZITVER, *Primary Examiner.*

H. ROBERTS, *Assistant Examiner.*